July 30, 1935. L. ZACHARA 2,009,570
ELECTRIC CONTROL SWITCH AND TESTER
Filed May 28, 1927
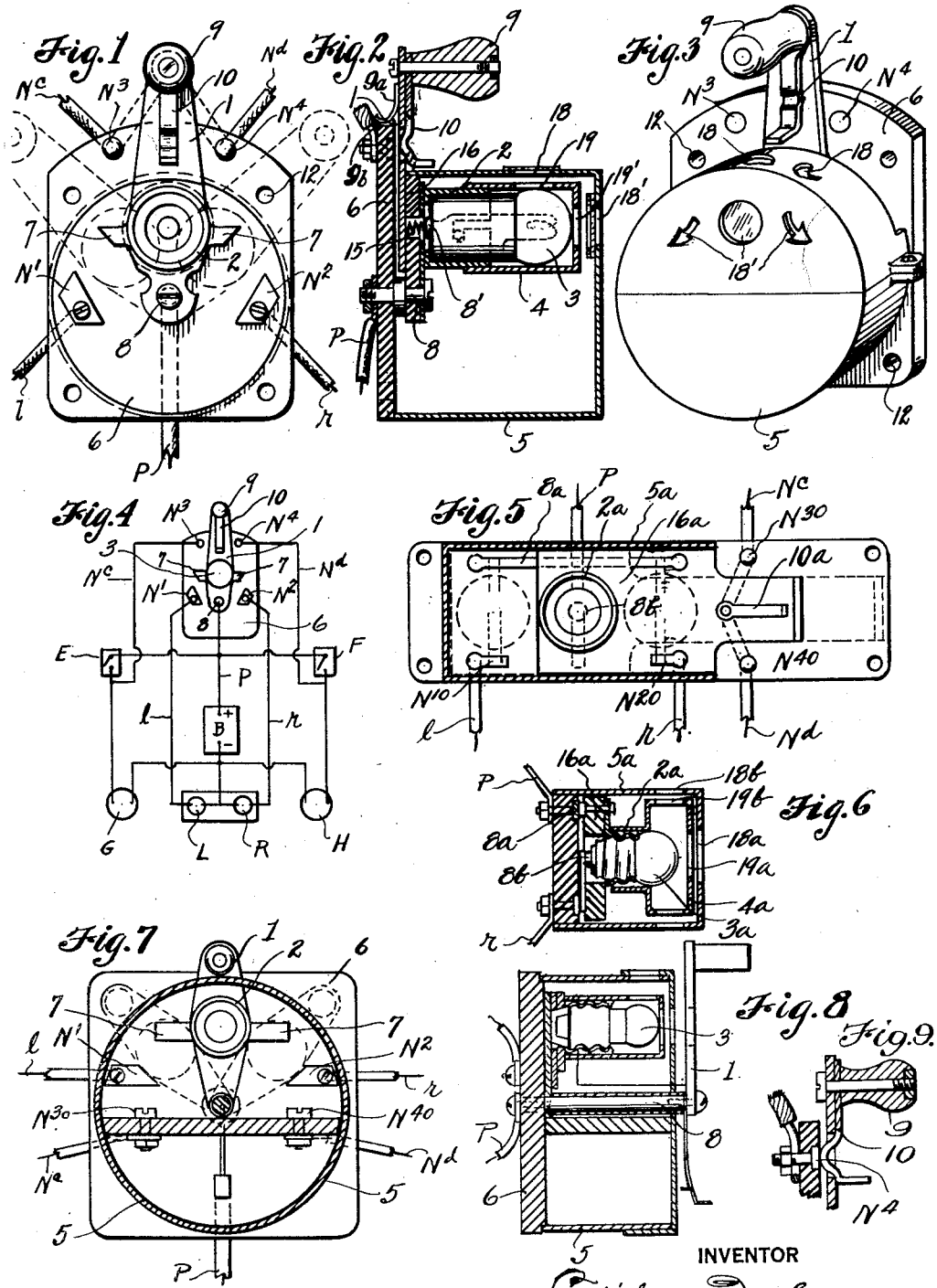
INVENTOR
Ladislaus Zachara Patented July 30, 1935

2,009,570

UNITED STATES PATENT OFFICE 2,009,570

ELECTRIC CONTROL SWITCH AND TESTER

Ladislaus Zachara, Bremerton, Wash.

Application May 28, 1927, Serial No. 195,104

5 Claims. (Cl. 177—329)

This invention relates to improvements in circuit testing and control switches, and has particular reference to a device of that character adapted to be associated with a plurality of electric circuits and which includes an indicating lamp and a switch lever that may be adjusted to different positions for individually testing each of the various circuits, the operativeness of which will be visibly indicated upon closing of the circuit by illumination of the lamp.

More specifically, the invention relates to the provision of a testing switch for use in connection with the electric wiring system of an automobile and it contemplates using the switch both as a means for testing the integrity of the stop signal light and tail light circuits and also as a control switch whereby the two circuits employed in a right and left turn signal device may be operated and the selection and operativeness of a selected circuit indicated to the vehicle operator.

It is the principal object of this invention to provide a switch of the above character that is of simple construction, practical, efficient, relatively inexpensive and easy to install on the instrument board of an automobile, and whereby the condition of the various circuits with which it may be connected may be tested at will, and whereby, when used as the controlling means for a right and left turn signaling device, its use for this purpose will not impair, or interfere with, its operativeness for testing any other circuit or circuits with which it is associated.

Other objects of the invention reside in the provision of a switch of the above character wherein the signal or indicating lamp moves with the switch lever to different positions for making different tests, or for closing circuits, and a housing incloses these parts which is provided with openings corresponding to the different positions of the lever and through which the light from the indicating lamp will be visible when the lever is at the testing position corresponding thereto.

Other objects of the invention reside in the various details of construction and in the combination of parts and in their mode of operation, as is hereinafter described.

In accomplishing these and other objects of the invention, I have provided the improved details of construction, the preferred forms of which are illustrated in the accompanying drawing wherein—

Figure 1 is a front view of a testing switch embodied by the present invention; the cover or housing and also the test lamp being removed from the mounting block for better illustration.

Figure 2 is a sectional view of the same, taken in the vertical plane in the switch lever mounting or axis.

Figure 3 is a perspective view of the switch, particularly illustrating the windows provided in the housing through which the test light is visible when the switch lever is at its different positions of adjustment corresponding thereto.

Figure 4 is a diagrammatic illustration of a wiring diagram for the testing device when used with right and left turn signals and stop signal and tail lights.

Figure 5 is a front view, with certain parts shown in section, of a testing switch of an alternative form of construction.

Figure 6 is a cross sectional view of the device shown in Figure 5.

Figure 7 is a front view of a switch that is a modification of the devices shown in Figure 1.

Figure 8 is a vertical, cross section of the same.

In Fig. 9 of the drawing is shown the testing lever 10, the function of the lever 10 is illustrated in the diagram of Fig. 4.

Referring first to the device as shown in Figures 1, 2 and 3, numeral 6 designates a switch board or panel of any suitable, non-conductive material provided at its corners with holes 12 for receiving mounting or attaching devices whereby it may be fixed to a support, which may be the instrument board of an automobile. Mounted on the panel 6, by means of a pivot member 8 which may be a short shaft, stud, screw, or the like, is a switch lever 1, of a conductive material, and which extends upwardly beyond the top edge of the panel and is provided at its end with a handle, or knob, 9 whereby it may be adjusted about its pivot from vertical position toward one side or the other, as is indicated in dotted lines in Figure 1, for the closing of different circuits as presently described. A yieldable stop member 9a is attached to the lever 1 to engage a notch 9b on the edge of panel 6 to hold the lever in neutral position.

Fixed to the lower portion of lever 1 and serving to mount it on the pivot 8, is a base plate 16 of non-conductive material on which is fixed a metallic socket 2 for an incandescent electric lamp 3. The socket 2 has a base extension through which the pivot 8 extends and by means of which an electrical connection between the parts 8 and 2 is made. A yieldable connection 15 is carried in a recess in the plate 16 and this engages at its ends, respectively, with the central terminal 8' of the lamp 3 and with the lever 1, so as to provide for completing a circuit connection through the lamp, as is presently apparent.

Fitted over the lamp, is a casing, or hood, 4 provided at the top with an opening 19 and at the end with an opening 19'. A casing, or housing, 5 of cylindrical form is fixed to the panel 6 coaxial of the pivot 8 and this incloses the lamp and hood and also the lower end portion of the switch lever. This housing is provided, in its end wall, with a series of three windows 18' and, in its upper wall, with a series of three windows 18. These windows, 18 and 18', are located at such positions that the openings 19 and 19' of the hood 4 will be disposed in registration therewith when the switch lever is disposed in a position corresponding thereto. For example, when the lever is in neutral or vertical position, windows 19—19' of the hood 4 register with the central openings 18—18', and when the lever is moved to the right or the left they register with the corresponding openings at the right or left of the central openings.

Mounted on the panel 6 at opposite sides of the pivot 8, are contacts $N^1$—$N^2$, and integrally formed with or in circuit connection with the lever 1, are oppositely directed, lateral extensions 7—7 adapted, by pivotal movement of the lever 1, to the right and to the left, to be brought, respectively, against contacts $N^1$ and $N^2$.

When the present switch is used as the control means for an electrically operated turn signal device having separate circuits for right and left turn signal lamps, as indicated at R and L respectively as in Figure 4, one of its circuit connections, as designated at P common to both circuits, would connect with the pivot 8 while the other circuit connection, r for the right and l for the left turn signal would connect, respectively, with the terminals $N^1$ and $N^2$. It is to be understood, of course, that there would be a suitable source of electricity, as at B, interposed in the circuit connection D so that, by movement of the lever 1 to either of its laterally inclined positions, as indicated in dotted lines in Figure 1, one of the contacts 7 would engage with a contact $N^1$ or $N^2$ and this, through connection l or r, would close a circuit through the selected signal; the circuit passing through the lamp 3 of the switch to thereby indicate to the operator that the circuit is in operative condition, and it would also give the operator a visible indication of the signal which he had selected by reference to the openings 18 and 18' through which the light is visible.

By reference to Figures 1 and 4, it will be readily apparent that when the switch lever is adjusted to one or the other of its oppositely inclined positions, the circuit will pass from circuit wire P to the pivot 8, thence to lamp socket 2, thence to the lamp 3, thence through the lamp filament and will return, through the contact 8', connection 15, lever 1 and extension 7 and contacts $N^1$ or $N^2$, depending upon the circuit selected. If the lamp does not become illuminated, this would indicate a break in the circuit.

Since most automobiles of the present day are equipped with a stop signal light and also with a tail light, I have made provision in the present switch for testing the integrity of the circuits for these two lights. It is to be understood that the present switch device is not intended to replace the usual control switches for the stop light and the tail light, but is used only in connection with the circuits for these lamps, and is in a shunt connection about their control switches. By reference to Figures 1–4, it will be noted that I have provided at opposite sides of the lever 1, the contacts $N^3$ and $N^4$ from which circuit wires $N^c$ and $N^d$ lead, respectively, to the circuit connections at one side of the switches E and F which, respectively, control the closing of the circuits for the tail lamp G and stop signal lamp H, while the circuit connections at the other side of the said control switches are to be connected to the source of electricity B through the circuit wire P which leads from battery B to the contact, or pivot 8.

Pivotally mounted on the upper end of the lever 1 so that it may swing radially about the knob, or handle, 9, is a testing lever 10 which may be adjusted into contact with one, the other of the contact $N^3$ or $N^4$ and when it is brought against either one, a circuit will be shunted through the lamp 3 about the control switch E or F of the stop light circuit or the tail light circuit selected and illumination of the lamp 3 will indicate that the circuit being tested is in working condition. The shunt line $N^d$ or $N^c$ actually shunts the service switch E or F and in time of testing establishes series between the testing lamp 3 and the tested lamp G or H by means of the lever 10 and contacts $N^3$, $N^4$. The shunt circuit wire $N^d$ or $N^c$ acts for both poles but at different times. If any of the service switches close their circuits and the lever 10 is in testing position the testing lamp 3 will stop glowing for the absence of negative current to the testing lamp 3, although the testing lever 10 may be in testing position the lamp 3 will go out. As soon as the service switch E or F is opened again the lamp 3 assumes its glowing again. In this way a double test is obtained.

In Figures 5 and 6 is an alternative construction in which 5a designates a housing within which a slide 16a is fitted. A lamp 3a is mounted in socket 2a on slide 16a with the socket contact of the lamp in sliding engagement with a conductive strip 8a and the central lamp contact 8b extended from the slide to a position at which it may be selectively engaged, by shifting the slide in opposite directions from a neutral position, with contact $N^{10}$ or $N^{20}$. Circuit wire P connects with strip 8a and wires l and r connect respectively with contacts $N^{10}$ and $N^{20}$. The slide has a handle portion at one end on which a lever 10a is pivotally mounted for swinging movement in opposite directions into engagement with contacts $N^{30}$ and $N^{40}$ to which wires $N^c$ and $N^d$ would connect. The lamp 3 in this instance also is inclosed in a housing or hood 4a provided with front and top openings 19a and 19b, respectively, and these by shifting of the slide, will be brought into registration with openings 18a and 18b in the housing 5a in the same manner and for the same purpose as described in the device of Figures 1, 2 and 3. Testing of the circuits of stop and tail lights is done by manipulation of lever 10a, and energizing of the signal lights is done by shifting of the slide from neutral to one or the other of its opposite limits of travel.

In Figures 7 and 8 is still another form of construction, quite similar in design to that of Figure 1, but having contacts $N^{30}$ and $N^{40}$ which correspond to contacts $N^3$ and $N^4$ of the device of Figure 1, located on a cross panel through the housing 5 and arranged to be engaged by the lateral extension 7—7 of the switch lever.

It is readily apparent that various other modifications other than those herein shown could be devised and that various changes in the devices illustrated could be made without departing from the spirit of the invention, and for this reason it is not intended that the claims be limited in scope only to the details specifically illustrated and described.

What I claim as new and desire to secure by Letters-Patent, is:

1. The combination with a plurality of electric circuits of a switch mechanism comprising individual contacts for the several circuits, a main switch lever of conductive material through which the circuits may be closed and having a permanent connection common to all circuits and movable from a neutral position against certain of said contacts to selectively close their corresponding circuits; a conductive testing lever attached to the switch lever and movable while the latter is in neutral position against the other of the contacts for selectively closing their corresponding circuits through the testing and main levers, and an indicating lamp in the connection that is common to all circuits and which will be illuminated by the closing of any of the circuits.

2. The combination with "right" and "left" turn signals and "stop" and "tail" lights and separate electric circuits for said signals and lights of a switch mechanism comprising individual contacts for the several circuits and a main switch element having a connection common to all circuits and movable from neutral position to selectively engage the contacts of the turn signals, a secondary switch lever mounted on the main switch element and connected therethrough to the common connection with all circuits and movable thereon, while the latter is in neutral position, against other of the contacts to selectively close the "tail light" or "stop light" circuit, and an indicating lamp mounted on the main switch element and within the connection common to all circuits, and adapted to be energized by the closing of any circuit to indicate the integrity of that circuit.

3. The combination with "right" and "left" turn signals and "stop" and "tail" lights and separate electric circuits for said signals and lights, of a switch mechanism comprising individual contacts for the several circuits, a main switch element having a connection common to all circuits and movable in opposite directions from a neutral position against certain contacts for selectively closing the circuit of either of the turn signals; a secondary switch lever mounted on the main lever and connected therethrough to the connection common with all circuits and movable thereon while the latter is in neutral position against other of the contacts, for selectively closing the tail light or stop light circuit, and an indicating lamp on the main element and electrically within the connection common to all circuits and adapted to be energized incident to the closing of any circuit to indicate integrity of that circuit, a detachable hood enclosing the lamp having an opening, and a housing enclosing the switch mechanism and lamp and having openings therein with which the opening of the hood will be caused to register when the switch lever is moved to different positions.

4. The combination with a plurality of direction indicating signals and electric circuits therefor and "stop" and "tail" lights with separate circuits therefor and with individual control switches in the "stop" and "tail" light circuits, of a control switch for the said signal circuits, including a switch element having a connection common to all circuits and movable from neutral position to positions for selectively closing either of said direction indicating circuits; an electric test lamp interposed in the said connection that is common to all circuits and adapted to be energized incident to the movement of the switch element to either signaling position to indicate the integrity of the circuit, and testing circuits connected with the "tail" and "stop" light circuits across their control switches and with contacts adjacent the switch element, and a testing switch lever carried by the switch element and connected therethrough and through the lamp with the connection common to all circuits and movable against either of said contacts to selectively close the circuits through the signalling devices and through the lamp to indicate the integrity of the circuit.

5. The combination with a source c˙ electricity and a plurality of separate electric lamp circuits connected therewith, each having an individual control switch therein, of a testing means for said circuits comprising a switch lever connected with one side of the source of electricity, individual contacts corresponding to the several circuits, shunt connections leading from the said contacts to their respective circuits and connected therewith across the control switch of the circuit, and a testing lamp in the connection between the switch lever and the source of electricity; said switch lever being movable from neutral position to selectively engage any one of the said contacts to test the integrity of the lamp circuit corresponding thereto.

LADISLAUS ZACHARA.